US010216758B2

(12) United States Patent
Gummaraju et al.

(10) Patent No.: US 10,216,758 B2
(45) Date of Patent: Feb. 26, 2019

(54) MULTI-TENANT PRODUCTION AND TEST DEPLOYMENTS OF HADOOP

(71) Applicant: VMware, Inc., Palo Alto, CA (US)

(72) Inventors: Jayanth Gummaraju, San Francisco, CA (US); Yunshan Lu, San Jose, CA (US); Razvan Cheveresan, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 1113 days.

(21) Appl. No.: 14/062,723

(22) Filed: Oct. 24, 2013

(65) Prior Publication Data
US 2015/0120791 A1 Apr. 30, 2015

(51) Int. Cl.
*G06F 17/30* (2006.01)
*G06F 9/455* (2018.01)

(52) U.S. Cl.
CPC .... *G06F 17/30194* (2013.01); *G06F 9/45558* (2013.01); *G06F 2009/45575* (2013.01)

(58) Field of Classification Search
CPC ............................................... G06F 17/30194
USPC ........................................................ 707/823
See application file for complete search history.

(56) References Cited

U.S. PATENT DOCUMENTS

| | | | |
|---|---|---|---|
| 2011/0167421 A1* | 7/2011 | Soundararajan | G06F 9/5077 718/1 |
| 2011/0258290 A1* | 10/2011 | Nightingale | G06F 17/30194 709/219 |
| 2011/0296052 A1* | 12/2011 | Guo | H04L 45/34 709/240 |
| 2013/0179574 A1* | 7/2013 | Calder | G06F 9/5033 709/226 |
| 2013/0227558 A1* | 8/2013 | Du | G06F 9/5077 718/1 |
| 2014/0173618 A1* | 6/2014 | Neuman | G06F 9/5066 718/104 |
| 2014/0280595 A1* | 9/2014 | Mani | H04L 12/1827 709/204 |

OTHER PUBLICATIONS

Razvan Cheveresan et al., "SEsparse in VMware vSphere 5.5", Technical White Paper, 2013, http://www.vmware.com/files/pdf/techpaper/SEsparse-vsphere55-perf.pdf, 19 pages.

\* cited by examiner

*Primary Examiner* — Hicham Skhoun
(74) *Attorney, Agent, or Firm* — Patterson & Sheridan, LLP

(57) ABSTRACT

A distributed computing application is described that provides a highly elastic and multi-tenant platform for Hadoop applications and other workloads running in a virtualized environment. Production, test, and development deployments of a Hadoop application may be executed using multiple compute clusters and a shared instance of a distributed filesystem, or in other cases, multiple instances of the distributed filesystem. Data nodes executing as virtual machines (VMs) for test and development deployments can be linked clones of data nodes executing as VMs for a production deployment to reduce duplicated data and provide a shared storage space.

20 Claims, 7 Drawing Sheets

MULTI-TENANT PRODUCTION AND TEST DEPLOYMENTS OF HADOOP

BACKGROUND

Distributed computing platforms, such as Hadoop or other MapReduce-related frameworks, include software that allocates computing tasks across a group, or "cluster," of distributed software components executed by a plurality of computing devices, enabling large workloads (e.g., data sets) to be processed in parallel and more quickly than is generally feasible with a single software instance or a single device. Such distributed computing platforms typically utilize a distributed file system that can support input/output-intensive distributed software components running on a large quantity (e.g., on the order of thousands) of computing devices to access a large quantity (e.g., petabytes) of data. For example, a data set to be analyzed by Hadoop may be stored within a Hadoop Distributed File System (HDFS) that is typically used in conjunction with Hadoop, which enables various computing devices running Hadoop software to simultaneously process different portions of the file.

SUMMARY

One or more embodiments disclosed herein provide a method for executing a distributed computing application within a virtualized computing environment for a plurality of tenants. The method includes instantiating a first plurality of virtual machines (VMs) on a plurality of hosts to form a first distributed filesystem. At least one VM of the first plurality of VMs may include a virtual disk configured to store data blocks. The method further includes storing an input data set in the first distributed filesystem, wherein the input data set comprises a plurality of data blocks. The first distributed filesystem may be accessible by a plurality of compute VMs configured to process the input data set. The method further includes instantiating a second plurality of VMs on the plurality of hosts to form a second distributed filesystem storing the same input data set. Each instantiated VM of the second plurality of VMs comprises a linked clone that references a virtual disk of a corresponding VM in the first plurality of VMs.

Further embodiments of the present disclosure include a non-transitory computer-readable storage medium that includes instructions that enable a processing unit to implement one or more of the methods set forth above or the functions of the computer system set forth above.

DETAILED DESCRIPTION

One or more embodiments disclosed herein provide methods, systems, and computer programs for executing a distributed computing application, such as Hadoop, in a virtualized environment. Data nodes and compute nodes are separated into different virtual machines (VMs) to allow compute nodes to elastically scale based on needs of the distributed computing application. In one embodiment, production, test, and development deployments of a Hadoop application may be executed using multiple compute clusters and a shared instance of a distributed filesystem, or in other cases, multiple instances of the distributed filesystem. Data nodes executing as VMs for test and development deployments can be linked clones of data nodes executing as VMs for a production deployment to reduce duplicated data and provide a shared storage space.

Figure 1A:
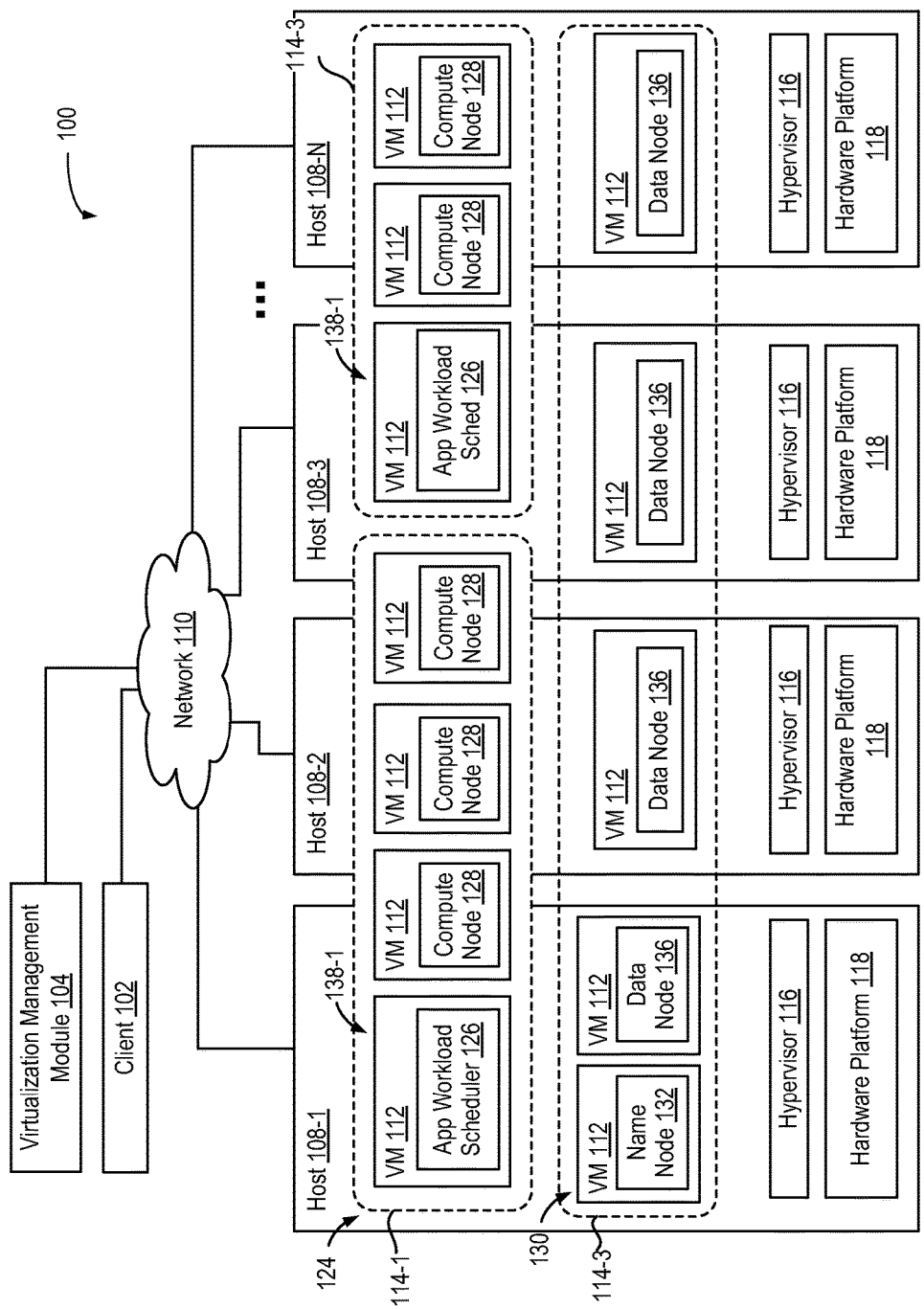
FIG. 1A is a block diagram that illustrates a virtualized computing system with which one or more embodiments of the present disclosure may be utilized.

FIG. 1A is a block diagram that illustrates a computing system 100 with which one or more embodiments of the present disclosure may be utilized. As illustrated, computing system 100 includes a plurality of host computers, identified as hosts 108-1, 108-2, 108-3, and 108-4, and referred to collectively as hosts 108. Each host 108 is configured to provide a virtualization layer that abstracts processor, memory, storage, and networking resources of a hardware platform 118 into multiple virtual machines (VMs) 112 that run concurrently on the same host 108. VMs 112 run on top of a software interface layer, referred to herein as a hypervisor 116, that enables sharing of the hardware resources of host 108 by the VMs 112. One example of hypervisor 116 that may be used in an embodiment described herein is a VMware ESXi hypervisor provided as part of the VMware vSphere solution made commercially available from VMware, Inc.

In one embodiment, VMs 112 may be organized into a plurality of resource pools, identified as resource pool 114-1, 114-2, and 114-3, which logically partitions available resources of hardware platforms 118, such as CPU and memory. Resource pools 114 may be grouped into hierarchies; resource pools 114 provide resources to "child" resource pools and virtual machines. Resource pools 114 enable a system administrator to organize resources of computing system 100, isolate VMs and computing resources from one resource pool to another, abstract resources from the actual hosts 108 that contribute the resources, and manage sets of VMs 112 associated with a resource pool 114. For example, a system administrator may control the aggregate allocation of resources to the set of VMs 112 by changing settings on the VMs' enclosing resource pool 114.

As shown, VMs 112 of hosts 108 may be provisioned and used to execute a number of workloads that deliver information technology services, including web services, database services, data processing services, and directory services. In one embodiment, one or more VMs 112 are configured to serve as a node of a cluster generated and managed by a distributed computing application 124 configured to elastically distribute its workload over a plurality of VMs that acts as nodes of the distributed computing application. Distributed computing application 124 may be configured to incorporate additional VMs or releasing unused VMs from its cluster—thereby growing and shrinking its profile within computing system 100. VMs 112 executing as nodes of distributed computing application 124 are shown in greater detail in FIG. 2.

Figure 2:
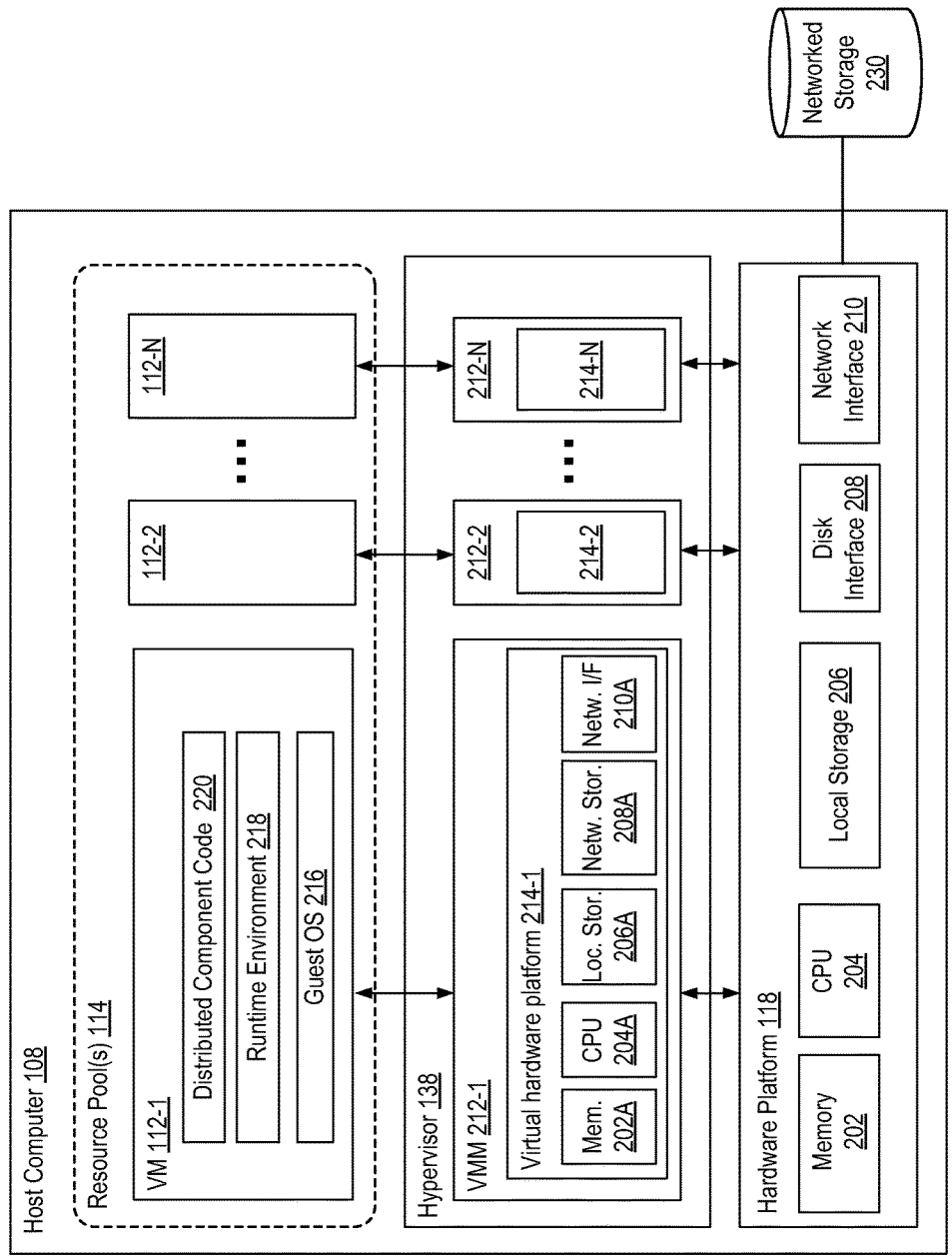
FIG. 2 is a block diagram that illustrates a host computer supporting one or more virtual machines, according to one embodiment of the present disclosure.

FIG. 2 is a block diagram that illustrates a host computer 108 supporting one or more virtual machines 112, according to one embodiment of the present disclosure. As shown, hardware platform 118 of each host 108 may include conventional components of a computing device, such as a memory 202, a processor 204, local storage 206, a disk interface 208, and a network interface 210. Processor 204 is configured to execute instructions, for example, executable instructions that perform one or more operations described herein and may be stored in memory 202 and in local storage 206. Memory 202 and local storage 206 are devices allowing information, such as executable instructions, cryptographic keys, virtual disks, configurations, and other data, to be stored and retrieved. Memory 202 may include, for example, one or more random access memory (RAM) modules; local storage 206 may include, for example, one or more hard disks, flash memory modules, solid state disks, and optical disks. Disk interface 208 enables host 108 to communicate with one or more network data storage systems that may, for example, store "virtual disks" that are accessed by VM nodes. Examples of disk interface 208 are a host bus adapter (HBA) that couples host 108 to a storage area network (SAN) or a network file system interface, depicted as networked storage 230. Network interface 210 enables host 108 to communicate with another device via a communication medium, such as network 110. An example of network interface 210 is a network adapter, also referred to as a Network Interface Card (NIC). In some embodiments, a plurality of NICs is included in network interface 210.

As described earlier, virtual machines (e.g., VMs 112-1 to 112-N) run on top of a hypervisor 116 that enables sharing of the resources of hardware platform 118 of host 108 by the virtual machines. Hypervisor 116 may run on top of the operating system of host 108 or directly on hardware components of host 108. Hypervisor 116 provides a device driver layer configured to map physical resource of hardware platforms 118 to "virtual" resources of each VM 112 such that each VM 112-1 to 112-N has its own corresponding virtual hardware platform (e.g., a corresponding one of virtual hardware platforms 214-1 to 214-N). Each such virtual hardware platform 214 provides emulated hardware (e.g., memory 202A, processor 204A, local storage 206A, networked storage 208A, network interface 210A, etc.) that may, for example, function as an equivalent, conventional hardware architecture for its corresponding VM 112. Virtual hardware platforms 214-1 to 214-N may be considered part of virtual machine monitors (VMMs) 212-1 to 212-N which implement virtual system support to coordinate operations between hypervisor 116 and corresponding VMs 112-1 to 112-N. In the embodiment depicted in FIG. 2, each VM 112 includes a guest operating system (OS) 216 (e.g., Microsoft Windows, Linux) and one or more guest applications running on top of guest OS 216. In one embodiment, each VM 112 includes a runtime environment 218, such as a Java Virtual Machine (JVM), that supports execution of a distributed software component code 220 (e.g., Java code) for distributed computing application 124. For example, if distributed computing application 124 is a Hadoop application, a VM 112 may have a runtime environment 218 (e.g., JVM) that executes distributed software component code 220 implementing a workload scheduler function (sometimes referred to as "Job Tracker"), "Task Tracker" function, or "Name Node" function, "Data Node" function, described further below. In another example of a distributed computing application 124, a VM 112 may have a runtime environment 218 (e.g., JVM) that executes distributed software component code 220 implementing a "Resource Manager" function, "Application Master" function, "Node Manager" function, and "Container" function, also described further below. Alternatively, each VM 112 may include distributed software component code 220 for distributed computing application 124 configured to run natively on top of guest OS 216.

Referring back to FIG. 1A, computing system 100 includes a virtualization management module 104 that may communicate to the plurality of hosts 108 via network 110. In one embodiment, virtualization management module 104 is a computer program that resides and executes in a central server, which may reside in computing system 100, or alternatively, running as a VM in one of hosts 108. One example of a virtualization management module is the vCenter® Server product made available from VMware, Inc. Virtualization management module 104 is configured to carry out administrative tasks for the computing system 100, including managing hosts 108, managing VMs running within each host 108, provisioning VMs, migrating VMs from one host to another host, load balancing between hosts 108, creating resource pools 114 comprised of computing resources of hosts 108 and VMs 112, modifying resource pools 114 to allocate and de-allocate VMs and physical resources, and modifying configurations of resource pools 114. In one embodiment, virtualization management module 104 may issue commands to power on, power off, reset, clone, deploy, and provision one or more VMs 112 executing on a particular host 108. In one embodiment, virtualization management module 104 is configured to communicate with hosts 108 to collect performance data and generate performance metrics (e.g., counters, statistics) related to availability, status, and performance of hosts 108, VMs 112, and resource pools 114.

Virtualization management module 104 may be configured to provide a virtual environment scheduler functionality that balances load across system 100 by balancing the VMs across hosts 108. For example, if the resource usage on one of the VMs in a resource pool drastically changes, the virtualization management module 104 moves around, or migrates, VMs among the physical hosts to optimize distribution of virtual machines across the hosts. Further, if the overall workload of all VMs decreases, the virtualization management module 104 may power down some of the physical hosts and consolidate the VMs across the remaining physical hosts. One example of a virtual environment scheduler is the VMware Distributed Resource Scheduler (DRS®) product made available from VMware, Inc.

In one embodiment, distributed computing application 124 may be an implementation of the MapReduce model, which is a distributed processing framework for large-scale data processing. MapReduce computations, referred to as jobs or applications, are broken into tasks that run in two phases—Map and Reduce. During the Map Phase, (Map) tasks read data from a distributed file system (in parallel) and perform their computations in parallel. At the end of the Map phase, the intermediate output (results of the computations) generated locally are sent to the Reduce phase (potentially remote) for aggregation or further processing, before the final results are written to the distributed file system. Hadoop is an open-source implementation of the MapReduce model, and may rely on a Hadoop Distributed File System (HDFS) for data storage.

In one embodiment, distributed computing application 124 includes an application workload scheduler 126 (e.g., executing in a VM) which accepts jobs from clients 102 and schedules corresponding workloads for execution on a plurality of compute nodes 128 that are associated with distributed computing application 124. In some implementations of Hadoop, application workload scheduler 126 may be referred to as a "JobTracker" node. Each compute node 128, which may be executing as a VM 112, is a worker node that carries out tasks (e.g., map tasks, reduce tasks of a MapReduce job) provided by application workload scheduler 126. Each compute node 128 may handle multiple tasks in parallel. In one embodiment, a compute node 128 is configured to run one or more tasks in one or more available "slots". In one example, each slot may be implemented as an instance of a runtime environment (e.g., Java Virtual Machine) executing distributed software component code (e.g., code 220) for completing a single task. As such, in some embodiments, each compute node 128 may execute multiple instances of the runtime environment to execute in parallel multiple tasks assigned to the compute node by the workload scheduler 126. In some implementations of Hadoop, compute nodes 128 may be referred to as "TaskTracker" nodes. If a compute node 128 fails due to software error, network problems, or other issues, application workload scheduler 126 is able to adjust its scheduling of the application workload accordingly. For example, application workload scheduler 126 may mark failed compute VMs as "unavailable" for accepting tasks, and modify placement of subsequent tasks to other slots in same nodes or other nodes based on the reduced amount of available resources.

Distributed computing application 124 may use a distributed filesystem 130, such as HDFS, configured to store and access data files in a distributed manner across nodes, referred to herein as data nodes 136. A file stored in distributed filesystem 130 is split into one or more data blocks, and the data blocks are stored in a set of data nodes 136. Each data node 136 may use and manage a data store in local storage 206 of the host on which each data node 136 is executing or in networked storage 230 accessible to the host on which each data node 136 is executing to store data blocks used by distributed computing application 124. In one embodiment, distributed filesystem 130 includes a name node 132 configured to track where data is located within storage resources of hosts 108 (e.g., local storage 206 and networked storage 230) and determine mappings of data blocks to data nodes 136. Data nodes 136 may be configured to serve read and write requests from clients of distributed filesystem 130, including distributed computing applications 124. Data nodes 136 may be further configured to perform block creation, deletion, and replication, upon instruction from name node 308.

In some embodiments, a virtual disk accessed by a VM 112 is represented by emulated local storage 206A and implemented as a file stored in local storage 206 of hardware platform 118. One example of a format for a virtual disk file is the ".vmdk" file format developed by VMware, Inc., although it should be recognized that any virtual disk file format may be utilized consistent with the teachings herein. Such a virtual disk may include guest OS 216, runtime environment 218, and distributed software component code 220. In such an embodiment, data nodes 136 may store and access HDFS data blocks within the virtual disk (i.e., emulated local storage 206A), where HDFS operates on top of the file system of guest OS 216, and, for example, stores HDFS data blocks as files within a folder of the file system of guest OS 216.

In some cases, multiple users may wish to run jobs concurrently in a distributed computing application, such as Hadoop. Such use-cases are often referred to as "multi-tenant" scenarios, where different client-organizations ("tenant") wish to share a single instance of the distributed computing application. Conventional Hadoop deployments have supported such multiple jobs using "Capacity" and "Fairness" metrics used in Hadoop scheduling, however there are several limitations under the conventional form. For example, in some cases, "slots" of worker nodes are conventionally only estimates of resources that will be consumed by each task. There is generally no enforcement (e.g., by killing a task) to ensure that these tasks conform to these limits. As such, conventional Hadoop deployments have been unable to provide quality of service (QoS) guarantees across tenants due to lack of enforcement of resource constraints and tradeoffs between over-commitment of resources and low resource utilization.

According to one embodiment, distributed computing application 124 may include separate virtual clusters 138 (e.g., 138-1, 138-2) per tenant. As shown in FIG. 1, separate clusters 138-1, 138-2, which include separate sets of application workload scheduler 126 and compute nodes 128, may be executing within computing system 100. Such embodiments advantageously provide stronger VM-grade security and resource isolation, and also enable deployment of multiple Hadoop runtime versions, or deployment of various types of frameworks besides and including Hadoop. For example, one cluster of a deployed framework that is a test version can be deployed in the same computing system as another cluster of a deployed framework that is a production version of Hadoop.

In one or more embodiments, each host 108 may include a separate data node 136 executing as a VM and one or more compute nodes 128 executing as VMs. In contrast to traditional implementations of Hadoop where each node is a combined data and compute node, this separation of compute and data nodes into separate VMs enables embodiments described herein to elastically scale Hadoop clusters as compute VMs 128 may be powered on and off without affecting HDFS. Accordingly, embodiments described herein advantageously provide efficient multi-tenancy and improved resource utilization. Further, while physical deployments of Hadoop can be modified to separate data and compute nodes, it has been determined that this may result in some machines being fully dedicated for compute and others fully dedicated for storage, which in turn leads to under-utilization of resources. Although some operation system-level virtualization techniques, such as Linux containers, can address some of these issues, it has been determined that operation system-level virtualization cannot guarantee the performance and security isolation that VMs provide to effectively support multi-tenancy. Accordingly, in embodiments of distributed computing application 124 running on a virtualized environment such as computing system 100, compute VMs 128 and data VMs 136 can be deployed on a same host 108, providing the ability to share the underlying hardware resources while allowing true multi-tenancy and elasticity.

In one or more embodiments, distributed computing application 124 includes separate compute clusters 138 for different tenants sharing a same storage layer of distributed filesystem 130 (e.g., HDFS). An example of a shared storage layer for multiple compute clusters 138 is described later in conjunction with FIG. 3. In other embodiments, distributed computing application 124 includes separate compute clusters 138 per tenant, each compute cluster communicating with a different instance of a storage layer. An example of multiple storage clusters for multiple compute clusters is described later in conjunction with FIG. 4.

Figure 1B:
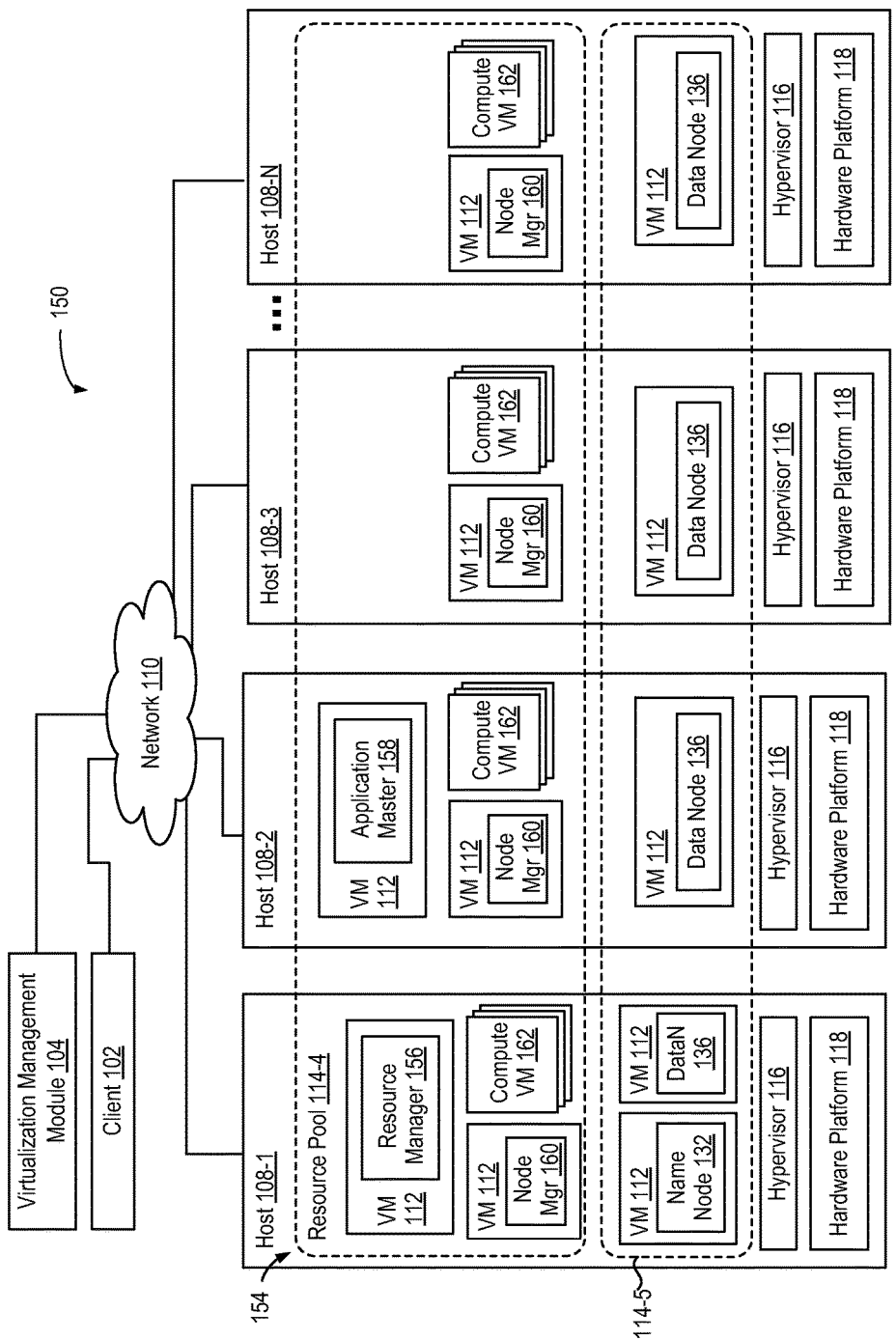
FIG. 1B is a block diagram that illustrates an alternative embodiment of a virtualized computing system with which one or more embodiments of the present disclosure may be utilized.

While the embodiment shown in FIG. 1A depicts one example architecture of a Hadoop application configured to process a large set of data using a distributed set of nodes, it should be recognized that alternative architectures, such as YARN (Yet Another Resource Negotiator) and other MapReduce-related architectures, may be utilized with the techniques described herein, as shown in FIG. 1B. It should be further recognized that, while embodiments of present disclosure are described in terms of a Hadoop installation, other distributed computing applications may be configured and utilized according to the techniques provided herein.

FIG. 1B is a block diagram that illustrates an alternative embodiment of a virtualized computing system 150 with which one or more embodiments of the present disclosure may be utilized. Computing system 150 includes an instance of a distributed computing application 154, which may be a Hadoop application configured according to a next generation framework, referred to as Hadoop YARN, which supports arbitrary distributed processing frameworks. YARN provides a collection of daemons and components that are responsible for handling resource requests from processing frameworks, resource acquisition, and scheduling. The distributed processing frameworks are then free to use the resources granted as each processing framework sees fit.

Distributed computing application 154 includes a resource manager 156, a plurality of node managers 160, and at least one application master 158. Resource manager 156, also referred to as a Hadoop Resource Manager (HRM), may be configured to accept jobs from clients (e.g., client 102) and manage resources for executing workloads within one or more nodes of distributed computing application 154. Application master 158 may be a framework-specific library configured to negotiate resources from resource manager 156 and work with one or more node managers 160 to schedule and execute tasks using the negotiated resources. Each job (sometimes referred to as an "application") can have its own instance of an application master 158, where a global resource manager 156 arbitrates between the application masters. Individual application masters 158 allow for better isolation, and distributed computing application 154 provides a general resource allocation framework that allows multiple frameworks to share underlying cluster resources.

In one embodiment, distributed computing application 154 uses a resource container module where frameworks make resource requests and, once granted in the form of "containers," can be used for any task desired. This leads to a more flexible resource usage model, and work-conserving resource usage that avoids a mismatch between available cluster resources and the resources required by a workload. Resource containers also provide isolation across multiple tenants as a result of policies used by a scheduler of resource manager 156 to allocate resources to different frameworks, applications, and tenants. As used herein, a container refers to a resource allocation that is the result of resource manager 156 granting a specific resource request from an application master 158. In other words, a container grants a right of application master 158 to use a specific amount of computing resources (e.g., CPU, memory, etc.) on a particular host 108 to execute tasks of a job. Application master 158 presents a container to a node manager 160 managing the host for which the container was allocated to use resources of the host for launching and executing tasks.

In one embodiment, each node manager 160 (e.g., executing on a VM 112 on a host 108) is configured to manage one or more compute VMs 162 executing on that host, monitor resource usage (e.g., CPU, memory, disk, network) of each compute VM 162, and report resource usage and performance metrics to resource manager 156. In the embodiment shown, computing system 150 includes one node manager 160 executing on each host 108, i.e., a single node manager 160 per host, although other arrangements may be used. At launch of distributed computing application 154, node manager 160 may provision (e.g., via virtualization management module 104) a set of pre-registered compute VMs 162 on each host 108. As mentioned above, each compute VM 162 is a worker node that carries out requested tasks (e.g., map tasks, reduce tasks) provided by a node manager 160, e.g., a node manager 160 executing on the same host 108. In one implementation, a compute VM 162 may execute a task by launching an instance of a runtime environment (e.g., Java Virtual Machine) executing distributed software component code 220 that executes the task.

MULTI-TENANCY FOR PRODUCTION AND TEST FRAMEWORKS

One particular use case for multi-tenant deployments of the Hadoop framework involves supporting at least one "production" cluster of a deployed framework that is a production version of Hadoop, and one or more "test" or "development" clusters that are test versions or development version of Hadoop in the same computing system. Production versions may be "live" and actively used by client-organizations. Test versions may be an upgraded version of the framework being tested prior to being deployed as the production version, and development clusters may be a version of the framework that is being modified by developers during a typical software development lifecycle. In this special case of multi-tenancy, users may desire to replicate a similar environment of the production version for use by test and development versions, e.g., for full-scale tests, without significantly affecting performance of the live performance version.

Conventional techniques for deploying test and development version of the framework include deploy multiple, independent Hadoop clusters (one per tenant). However, under this approach, the number of compute nodes increases linearly with the number of tenants and storage space is partitioned across Hadoop clusters, and therefore does not scale with increasing numbers of tenants. This approach also involves copying the entire contents of the production data, e.g., data stored in production HDFS, which results in a wasteful use of storage resources. Further, conventional approaches incur significant management overhead and cost as the multiple independent clusters may need to be separately upgraded, patched, and administrated.

Accordingly, embodiments described herein provide multiple clusters that are deployed (i.e., one each for production, test, and development frameworks), but share just one underlying common storage substrate (e.g., HDFS).

Figure 3:
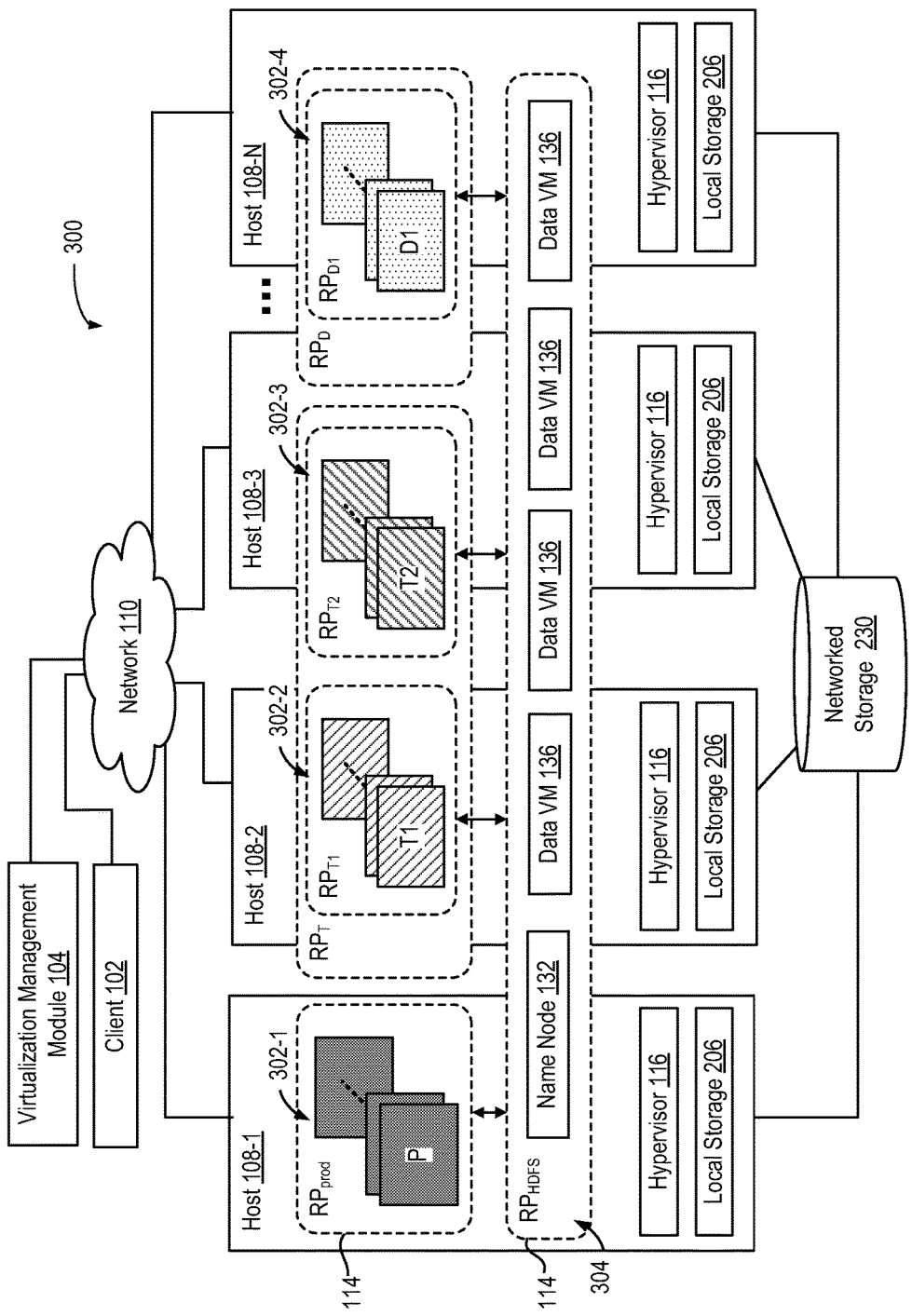
FIG. 3 is a block diagram that depicts a distributed computing application having compute VMs from different tenants sharing a distributed storage layer, according to an embodiment of the present disclosure.

FIG. 3 is a block diagram that depicts a computing system 300 executing a distributed computing application having compute VMs from different tenants that share a distributed storage layer, according to an embodiment of the present disclosure. In the embodiment shown, computing system 300 includes a plurality of compute clusters (e.g., 302-1, 302-2, 302-3, 302-4) and a shared distributed filesystem 304

(e.g., HDFS) distributed across a plurality of hosts 108 of computing system 300. Each compute cluster 302 may be configured similarly to clusters 138 shown in FIG. 1A, for example, having an application workload scheduler 126 and a plurality of compute VMs, although other compute clusters, such as distributed computing application 154 shown in FIG. 1B may be used. Similarly, distributed filesystem 304 may be configured similarly to distributed filesystem 130 shown in FIGS. 1A and 1B, for example, having a name node 132 and data VMs 136.

Each compute cluster 302 may be associated with a particular tenant, i.e., dedicated to executing jobs received from that particular tenant. As shown, one compute cluster 302-1 is a compute cluster designated as a production environment, which is a "live" and currently active deployment of distributed computing application 124. Compute clusters 302-2 and 302-3 are designated as test environments, which is a deployment of distributed computing application 124 being tested prior to release as a production environment under current software development processes. Compute cluster 302-3 is designated as a development environment, which is a deployment of distributed computing application 124 used by developers during modification according to software development processes. In some embodiments, test and development deployments may be different, upgraded versions of the instance of production compute cluster 302-1. In some embodiments, test and development clusters may be configured to use an identical or substantially similar input data set as used by production compute cluster 302-1 to ensure process consistency and satisfy regression testing.

In the embodiment shown, production, test, and development compute clusters 302 and distributed filesystem 304 may be organized into different resource pools 114 for resource management and isolation purposes (i.e., changes within one resource pool do not impact other unrelated resource pools). For example, VMs of compute cluster 302-1 (identified with "P") are organized into a resource pool (identified as $RP_{PROD}$) associated with the production environment. VMs of a first test compute cluster 302-2 (identified with a "T1") and VMs of a second test compute cluster 302-3 (identified with "T2") are organized into separate resource pools $RP_{T1}$ and $RP_{T2}$, respectively, which are part of a parent resource pool $RP_T$. VMs of a first development compute cluster 302-3 (identified with a "D1") are organized into a resource pool $RP_{D1}$, which is a child resource pool of a resource pool $RP_D$ associated with development clusters. VMs of distributed filesystem 304, including a name node 132 and data VMs 136, are organized into their own resource pool $RP_{HDFS}$ separate from resource pools of the compute clusters.

In one or more embodiments, resource controls of resource pools 114 associated with different compute clusters 302 and distributed filesystem 304 may be configured to provide differentiated quality of service (QoS) between tenants (i.e., production, test, development frameworks). In some embodiments, resource controls such as "reservations," "limits", and "shares" settings may be set for each resource pool (e.g., $RP_{PROD}$, $RP_T$, $RP_{T1}$, $RP_{T2}$, $RP_D$, $RP_{D1}$, $RP_{HDFS}$) to manage allocation of computing resources (e.g., memory, CPU) of computing system 300.

As mentioned above, distributed filesystem 304 is shared between compute clusters 302-1, 302-2, 302-3, and 302-4. Data VMs 136 may be accessed by compute nodes of the different compute clusters to read and write data blocks during operation, i.e., execution of Hadoop jobs. In one embodiment, distributed filesystem 304 may store data blocks of an input data set used by production compute cluster 302-1 and shared by at least one test or development cluster. As such, since production compute clusters and test/development clusters are sharing the same instance of distributed filesystem having the input data set, embodiment described herein reduce unnecessary duplication of data within computing system 100 (it should be recognized that data replication may occur within the distributed filesystem for fault tolerance and availability purposes). It should be further recognized that because data VMs provide a common storage space shared across tenants, embodiments described herein avoid partitioning effects that arise with conventional techniques using separate independent Hadoop deployments.

As an instance of HDFS, distributed filesystem 304 may be configured to support a traditional hierarchical file organization, and store output data resulting from execution of jobs in one or more files stored inside directories. In one embodiment, distributed filesystem 304 is configured to use a prefix with a directory to avoid overwriting data between compute clusters 302. In some embodiments, each compute cluster 302 may use a different pre-determined prefix to differentiate output written by different tenants. For example, test compute cluster 302-2 may a "test1-" directory prefix for all files written to distributed filesystem 304 by test compute cluster 302-2. In some embodiments, distributed filesystem 304 may be configured to set quotas for an amount of space used for individual directories associated with each tenant. As such, embodiments described herein may allocate storage resources to different tenants and ensure that a particular tenant (e.g., a test deployment) does not occupy an undue amount of storage space within computing system 300.

Figure 4:
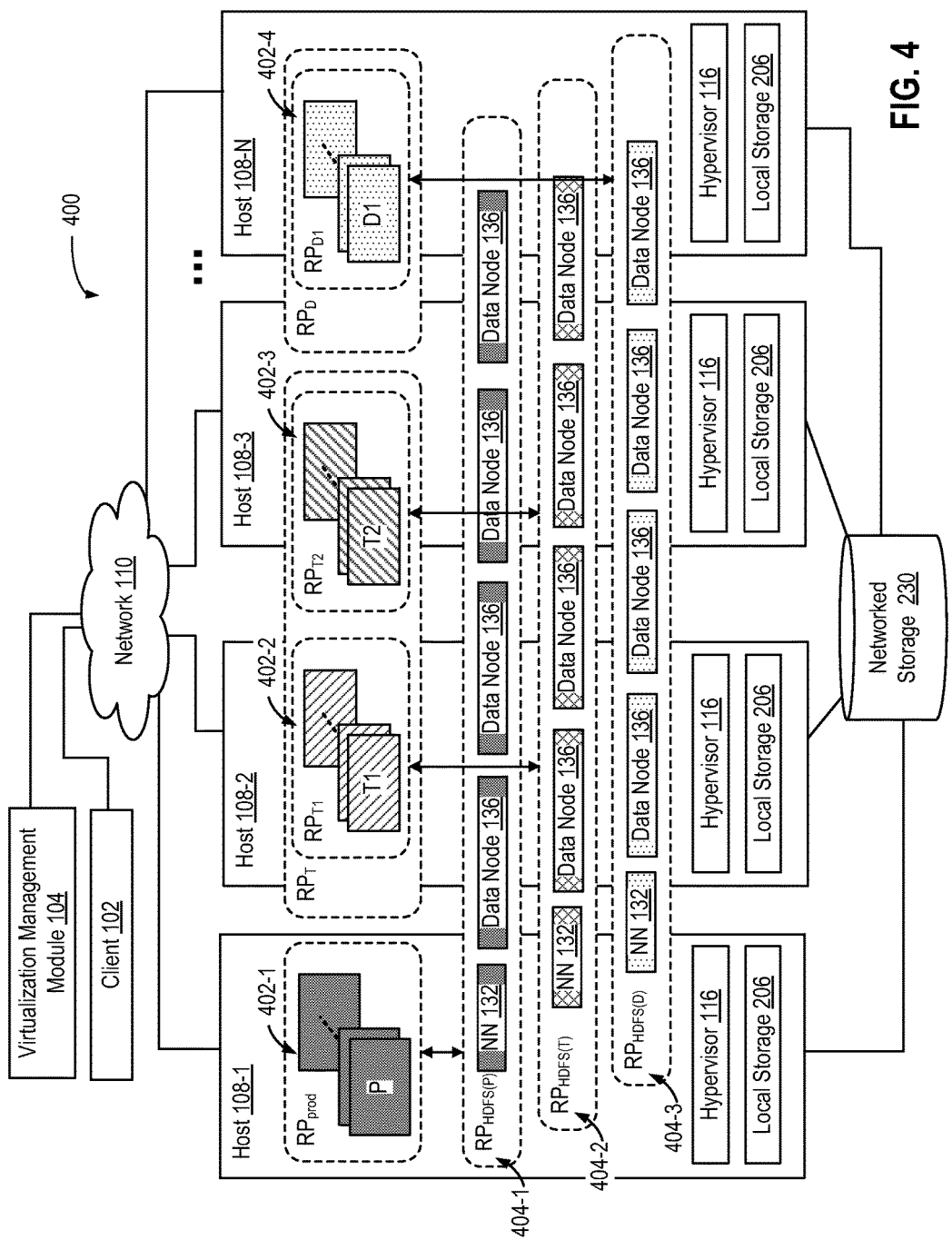
FIG. 4 is a block diagram that depicts a distributed computing application having separate compute clusters from different tenants using separate distributed storage clusters, according to an embodiment of the present disclosure.

FIG. 4 is a block diagram that depicts a computing system 400 executing a distributed computing application having separate compute clusters from different tenants using separate distributed filesystems, according to an embodiment of the present disclosure. In the embodiment shown, computing system 400 includes a plurality of compute clusters (e.g., 402-1, 402-2, 402-3, 402-4) distributed across a plurality of hosts 108 of computing system 400. Similar to the embodiment shown in FIG. 3, the plurality of compute clusters 402 may include a production compute cluster 402-1, test compute clusters 402-2 and 402-3, and a development compute cluster 402-4, and are organized into resource pools $RP_{PROD}$, $RP_{T1}$, $RP_{T2}$, $RP_{D1}$, respectively, as shown in FIG. 4.

In contrast to computing system 300, computing system 400 includes a plurality of distributed filesystems (e.g., 404-1, 404-2, 404-3) associated with a particular compute cluster 402. The multiple instances of distributed filesystem 404 include separate instances of name nodes 132 and data VMs 136. Compute VMs of a particular compute cluster 402 are configured to access data VMs of the corresponding distributed filesystem 404 associated with the tenant. For example, compute VMs of production compute cluster 402-1 read and write data blocks to data VMs 136 of distributed filesystem 404-1 associated with the production environment. Similarly, compute VMs of test compute cluster 402-3 may read and write data to data VMs 136 of distributed filesystem 404-2 associated with the test environment.

In one embodiment, VMs of a distributed filesystems 404-1 associated with a production compute cluster 402-1 are organized into their own resource pool $RP_{HDFS(P)}$; VMs of a distributed filesystem 404-2 associated with test compute clusters 402-2 and 402-3 are organized into a resource pool $RP_{HDFS(T)}$; and VMs of a distributed filesystem 404-3 associated with development compute cluster 402-4 are organized into resource pool $RP_{HDFS(D)}$. Accordingly, embodiments described herein may guarantee QoS across tenants because computing resources may be isolated not just with compute VMs (e.g., memory, CPU), but also with data VMs (e.g., storage, disk I/O) associated with different tenants. Unlike in previous approaches, data traffic associated with different tenants is in fact going to separate VMs, which may be differentiated, isolated, and managed accordingly. In some embodiments, resource controls of resource pools 114 associated with different distributed filesystems 404 may be configured to provide differentiated quality of service (QoS) between tenants (i.e., production, test, development frameworks).

In one embodiment, data VMs 136 associated with a particular tenant may be linked clones of data VMs 136 associated with another tenant. For example, data VMs 136 of distributed filesystem 404-2 associated with a test environment may be linked clones of data VMs 136 of distributed filesystem 404-1 associated with the production environment. Accordingly, in cases where replicated environments are desired, e.g., as in production, test, development environments, embodiments described herein share the common underlying data stored within one distributed filesystem and avoid unnecessary replication of data. As such, data VMs of different distributed filesystems still provide a common storage space shared across tenants and still avoids partitioning effects that arise with conventional techniques using separate storage clusters.

Figure 5:
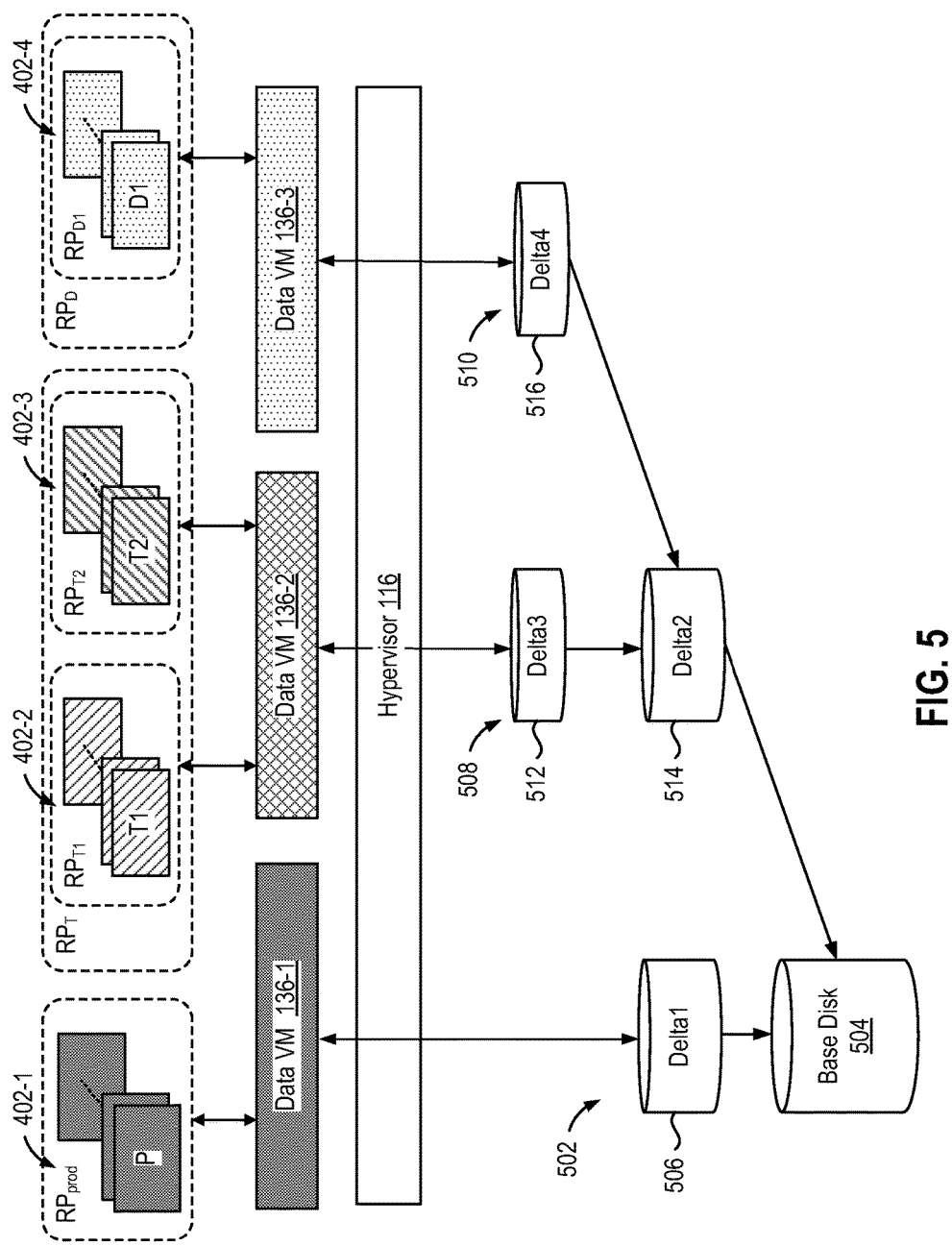
FIG. 5 is a block diagram depicting data virtual machines in separate distributed storage clusters, according to one embodiment of the present disclosure.

FIG. 5 is a block diagram depicting data VMs 136 in separate distributed filesystems, according to one embodiment of the present disclosure. As shown in FIG. 5, compute clusters associated with different tenants access corresponding data VMs associated with the different tenants. For example, compute VMs of compute clusters 402-1, 402-2, 402-3, and 402-4 associated with production, test, and development tenants, respectively, access corresponding data VMs 136-1 (production), 136-2 (test), and 136-3 (development). In the embodiment shown, data VMs 136-1, 136-2, 136-3 associated with different tenants are executing on the same host 108. To illustrate multi-tenancy, compute VMs and data VMs with a particular tenant are depicted with like shading.

In one or more embodiments, test and development data VMs 136-2, 136-3 may be linked clones of production data VM 136-1. As described earlier, each data VM 136 includes a virtual disk configured to store and access HDFS data blocks of one or more files, such as an input data set of a Hadoop job. In the embodiment shown, production data VM 136-1 includes a virtual disk 502 comprised of at least a base disk 504 and at least one delta disk 506 (identified as "Delta1"). Base disk 504 may be a shared, read-only volume containing HDFS data blocks common to multiple distributed filesystems. Changes written to virtual disk 502 of production data VM 136-1, such as output files generated during operation of the production Hadoop application, are routed and recorded to delta disk 506 (sometimes referred to as redo log files).

In one embodiment, as linked clones of production data VM 136-1, test and development data VMs 136-2 and 136-3 include virtual disks 508, 510 that reference virtual disk 502 of production data VM 136-1. In some embodiments, test and development data VMs 136-2 and 136-3 may include a tree-like structure of delta disks having a parent that is base disk 504 of production data VM 136-1, as depicted in FIG. 5. Specifically, virtual disk 508 of test data VM 136-2 includes delta disks 512, 514 having a parent virtual disk that is base disk 504; virtual disk 510 of development data VM 136-3 includes a delta disk 516 which ultimately references base disk 504 (via reference to virtual disk 508).

In operation, disk operations (i.e., reads, writes) performed within data VMs 136 require parsing each delta disk in the chain to reach data blocks of an input data set or other files shared by the compute clusters, which can produce additional disk overhead on the host. For example, if a read I/O operation is issued by a data VM, the read operation may be serviced from either the base disk or the associated delta disk, depending on where the latest data resides. As the number of delta disks increase, performance may decrease because of the need to traverse through multiple levels of metadata information of delta disks to locate a latest version of the data block. Accordingly, embodiments described herein may be configured to minimize a number of delta disks for a virtual disk of a data VM 136 associated with a high priority tenant. As users may wish to ensure that performance of a production environment is unaffected when executing additional test and development clusters, production data VM 136-1 may be configured with a base disk 504 and a single delta disk 506. A data VM instantiated for another tenant may be cloned based on base disk 504, and any subsequent data VMs for other tenants (i.e., test, development) may be instantiated as linked clones from the last previously created linked clone. This yields the tree of delta disks shown in FIG. 5, although other arrangements and configurations of delta disks may be used. Accordingly, the "read-only" blocks from base disk 504 can be directly serviced from production data VMs (e.g., 136-1) with QoS guarantees provided from test and production data VMs (e.g., 136-2, 136-3), and all write operations go to the delta disk. As such, when production data VM 136-1 issues a read I/O operation on virtual disk 502, the read operation may be serviced from base disk 504 or delta disk 506, without needing to traverse the additional delta disks formed when the test and development data VMs are instantiated.

Figure 6:
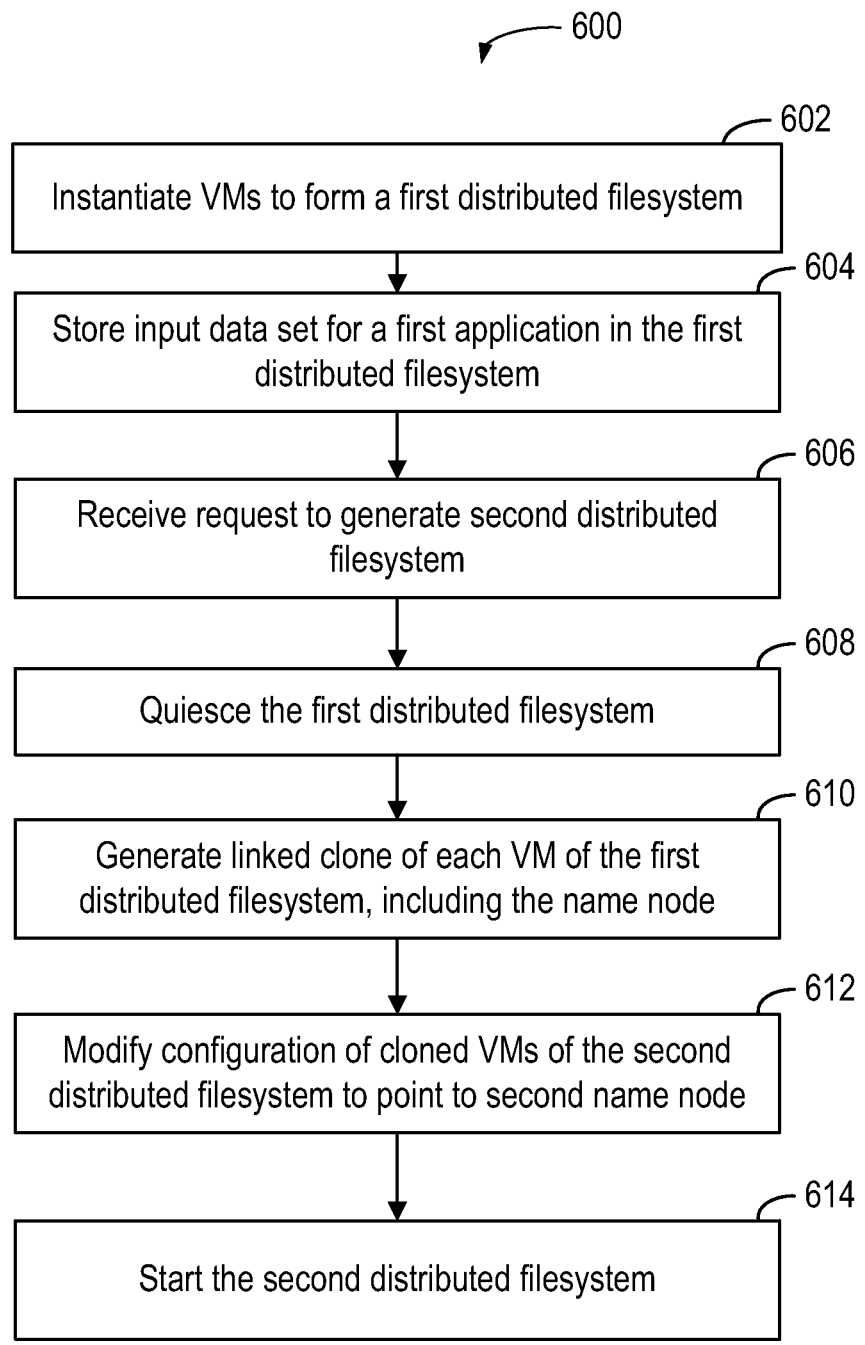
FIG. 6 is a flow diagram that illustrates steps for a method of providing distributed storage for a distributed computing application executing within a virtualized environment, according to an embodiment of the present disclosure

FIG. 6 is a flow diagram that illustrates steps for a method 600 of providing distributed storage for a distributed computing application executing within a virtualized environment, according to an embodiment of the present disclosure. It should be recognized that, even though the method is described in conjunction with the system of FIGS. 1A, 1B, 2-4, any system configured to perform the method steps is within the scope of embodiments of the disclosure.

At step 602, a first plurality of VMs is instantiated on a plurality of hosts 108 to form a first distributed filesystem. The first distributed filesystem may be associated with a first tenant. At least one VM of the first plurality of VMs may include a virtual disk configured to store data blocks. In one embodiment, the first plurality of VMs that are instantiated includes a first name node VM associated with the first distributed filesystem. The first name node VM may include location information for each data block of the input data set and a corresponding location within the first plurality of VMs.

In one embodiment, the first distributed filesystem is accessible by a plurality of compute VMs configured to process data. In some embodiments, the plurality of compute VMs may include a first plurality of compute VMs associated with executing a first application for processing an input data set, and a second plurality of compute VMs associated with executing a second application for processing the (same or similar) input data set. In some embodiments, the first application may be a production deployment of a Hadoop or other distributed computing application, and the second application may be a test or development deployment of the Hadoop or other distributed computing application. As such, the first distributed filesystem may be associated with a production environment for processing the input data set, and the second distributed filesystem may be associated with a test environment. In another embodiment, the plurality of compute VMs may include a plurality of container VMs and at least one node manager VM configured to launch the plurality of container VMs for executing tasks on the input data set, as described earlier in conjunction with FIG. 1B.

An application workload scheduler 126 may receive a job request to process data of an input data set in distributed computing application 124. At step 602, application workload scheduler 126 stores the input data set, which may include a plurality of data blocks, in the first distributed filesystem.

At step 606, a request to generate a second distributed filesystem is received. For example, the second distributed filesystem may be associated with a second tenant. At step 608, the first distributed filesystem may be quiesced to halt or pause traffic going into the first distributed filesystem while the second distributed filesystem is being formed.

In one embodiment, a second plurality of VMs is instantiated on the plurality of hosts to form a second distributed filesystem storing the same input data set. In some embodiments, the first plurality of VMs is associated with a first resource pool, and the second plurality of VMs is associated with a second resource pool.

At step 610, a linked clone is generated for each VM of the first distributed filesystem to form the second distributed filesystem. Clones may be generated for each of data VMs 136 of the first distributed filesystem, as well as for the name node of the first distributed filesystem to create a second name node associated with the second distributed filesystem. Each instantiated VM of the second plurality of VMs comprises a linked clone that references a virtual disk of a corresponding VM in the first plurality of VMs. In some embodiments, the virtual disk of a first VM of the first plurality of VMs comprises a base virtual disk storing data blocks and a first delta disk, and the virtual disk of a corresponding second VM of the second plurality of VMs comprises a second delta disk that references the base virtual disk of the first VM. In some embodiments, the virtual disk of the second name node includes a base disk storing block information, which may include a namespace tree and a mapping of data blocks to data nodes, from the first name node associated with the first distributed filesystem.

Each of the second plurality of VMs that form the second distributed filesystem may be modified to include a new identity differentiated from the first distributed filesystem, such as data nodes of a second distributed filesystem. At step 612, the second plurality of VMs (i.e., cloned VMs) associated with the second distributed filesystem are modified to point to the second name node. In one embodiment, the configuration of the second name node is updated to include a new identity differentiated from the identity of the first name node of the first distributed filesystem. The configuration of the second distributed filesystem may be updated on each of the cloned data VMs to point to the second name node. In one particular implementation, one or more configuration files (e.g., core-site.xml) of each VM of the second plurality of VMs is updated to include a reference to the second name node, such as a network address, location information, or other identifier, as well as other information used by data nodes to communicate with a name node.

At step 614, the second distributed filesystem is launched. In one embodiment, the second plurality of data VMs and the second name node may be restarted upon updating their respective configuration files, and begin operation according to the updated configuration. As a linked clone of the first name node, the second name node may already contain block information for the second plurality of data VMs. As such, upon startup, the second plurality of data VMs (e.g., instantiated in step 610) may register with the second name node and populate block information accordingly. For example, the second plurality of data VMs may transmit a block report (as part of the initialization process of the second distributed filesystem) to the second name node and finish re-establishing the metadata for the second distributed filesystem.

Additional distributed filesystem instances may be formed similarly. A third plurality of VMs may be instantiated on the plurality of hosts to form a third distributed filesystem storing the same input data set. In some embodiments, the third plurality of data VMs includes linked clones that reference the base virtual disk of a corresponding data VM, rather than the first delta disk of the corresponding data VM. In other embodiments, the third plurality of data VMs includes linked clones that reference a linked clone of a corresponding data VM of the second plurality of VMs (of the second distributed filesystem).

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for executing a distributed computing application within a virtualized computing environment for a plurality of tenants, the method comprising:
    instantiating a first plurality of virtual machines (VMs) on a plurality of hosts, wherein each of the first plurality of VMs is configured as a data-only node of a first distributed file system, and has a virtual disk;
    storing an input data set in the first distributed file system by storing the input data set in a plurality of data blocks of the virtual disks of the first plurality of VMs;
    instantiating a second plurality of VMs on the plurality of hosts, wherein each of the second plurality of VMs is configured as a data-only node of a second distributed file system storing the same input data set, and comprises a linked clone that references a virtual disk of a corresponding VM in the first plurality of VMs; and
    instantiating a third plurality of VMs, wherein each of the third plurality of VMs is configured as a compute-only node, the compute-only nodes including a first set of compute only nodes that are configured to process the input data set in the first distributed file system for a first tenant and to process the input data set in the second distributed file system for a second tenant.

2. The method of claim 1,
    wherein the virtual disk of a first VM of the first plurality of VMs comprises a base virtual disk storing data blocks and a first delta disk, and
    wherein the virtual disk of a corresponding second VM of the second plurality of VMs comprises a second delta disk that references the base virtual disk of the first VM.

3. The method of claim 2, further comprising:
    instantiating a fourth plurality of VMs on the plurality of hosts, wherein each of the fourth plurality of VMs is configured as a data-only node of a third distributed file system storing the same input data set, and comprises a linked clone that references the base virtual disk of the first VM, not the first delta disk.

4. The method of claim 1, further comprising:
    instantiating a fourth plurality of VMs on the plurality of hosts, wherein each of the fourth plurality of VMs is configured as a data-only node of a third distributed file system storing the same input data set, and comprises a linked clone that references the linked clone of a corresponding VM of the second plurality of VMs.

5. The method of claim 1, wherein instantiating the first and second plurality of VMs on the plurality of hosts comprises:
    instantiating a VM as a first name node associated with the first distributed file system and a VM as a second name node associated with the second distributed file system, wherein the second name node comprises a linked clone that references a virtual disk of the first name node, and wherein the virtual disk of the first name node includes location information for each data block of the input data set and a corresponding location within the first plurality of VMs; and
    modifying a configuration of the second plurality of VMs to include information associated with the second name node.

6. The method of claim 1, wherein the first plurality of VMs is associated with a first resource pool, and the second plurality of VMs is associated with a second resource pool.

7. The method of claim 1, wherein the first distributed file system is associated with a production environment for processing the input data set, and the second distributed file system is associated with a test environment.

8. The method of claim 1, wherein the third plurality of VMs includes a first number of compute-only nodes associated with executing a first application for processing the input data set, and a second number of compute-only nodes associated with executing a second application for processing the input data set.

9. The method of claim 1, wherein the third plurality of compute VMs comprises includes a plurality of container VMs and at least one node manager VM configured to launch the plurality of container VMs for executing tasks on the input data set.

10. A non-transitory computer-readable storage medium comprising instructions that, when executed in a computing device, execute a distributed computing application within a virtualized computing environment for a plurality of tenants, by performing the steps of:
    instantiating a first plurality of virtual machines (VMs) on a plurality of hosts, wherein each of the first plurality of VMs is configured as a data-only node of a first distributed file system, and has a virtual disk;
    storing an input data set in the first distributed file system by storing the input data set in a plurality of data blocks of the virtual disks of the first plurality of VMs;
    instantiating a second plurality of VMs on the plurality of hosts, wherein each of the second plurality of VMs is configured as a data-only node of a second distributed file system storing the same input data set, and comprises a linked clone that references a virtual disk of a corresponding VM in the first plurality of VMs; and
    instantiating a third plurality of VMs, wherein each of the third plurality of VMs is configured as a compute-only node, the compute-only nodes including a first set of compute—only nodes that are configured to process the input data set in the first distributed file system for a first tenant and to process the input data set in the second distributed file system for a second tenant.

11. The non-transitory computer-readable storage medium of claim 10, wherein the virtual disk of a first VM of the first plurality of VMs comprises a base virtual disk storing data blocks and a first delta disk, and wherein the virtual disk of a corresponding second VM of the second plurality of VMs comprises a second delta disk that references the base virtual disk of the first VM.

12. The non-transitory computer-readable storage medium of claim 11, further comprising the steps of:

instantiating a fourth plurality of VMs on the plurality of hosts, wherein each of the fourth plurality of VMs is configured as a data-only node of a third distributed file system storing the same input data set, and comprises a linked clone that references the base virtual disk of the first VM, not the first delta disk.

13. The non-transitory computer-readable storage medium of claim 10, further comprising the steps of:

instantiating a fourth plurality of VMs on the plurality of hosts, wherein each of the fourth plurality of VMs is configured as a data-only node of a third distributed file system storing the same input data set, and comprises a linked clone that references the linked clone of a corresponding VM of the second plurality of VMs.

14. The non-transitory computer-readable storage medium of claim 10, wherein instantiating the second plurality of VMs on the plurality of hosts to form the second distributed file system further comprises the steps of:

instantiating a VM as a first name node associated with the first distributed file system and a VM as a second name node associated with the second distributed file system, wherein the second name node comprises a linked clone that references a virtual disk of the first name node, and wherein the virtual disk of the first name node includes location information for each data block of the input data set and a corresponding location within the first plurality of VMs; and modifying a configuration of the second plurality of VMs to include information associated with the second name node.

15. The non-transitory computer-readable storage medium of claim 10, wherein the first plurality of VMs is associated with a first resource pool, and the second plurality of VMs is associated with a second resource pool.

16. The non-transitory computer-readable storage medium of claim 10, wherein the first distributed file system is associated with a production environment for processing the input data set, and the second distributed file system is associated with a test environment.

17. The non-transitory computer-readable storage medium of claim 10, wherein the third plurality of VMs includes a first number of compute-only nodes associated with executing a first application for processing the input data set, and a second number of compute-only nodes associated with executing a second application for processing the input data set.

18. A computer system having a plurality of hosts executing a plurality of virtual machines (VMs) for executing a distributed computing application within a virtualized computing environment for a plurality of tenants, the computer system comprising:

a memory; and a processor programmed to carry out the steps of:

instantiating a first plurality of virtual machines (VMs) on a plurality of hosts, wherein each of the first plurality of VMs is configured as a data-only node of a first distributed file system, and has a virtual disk;

storing an input data set in the first distributed file system by storing the input data set in a plurality of data blocks of the virtual disks of the first plurality of VMs;

instantiating a second plurality of VMs on the plurality of hosts, wherein each of the second plurality of VMs is configured as a data-only node of a second distributed file system storing the same input data set, and comprises a linked clone that references a virtual disk of a corresponding VM in the first plurality of VMs; and instantiating a third plurality of VMs, wherein each of the third plurality of VMs is configured as a compute-only node, the compute-only nodes including a first set of compute-only nodes that are configured to process the input data set in the first distributed file system for a first tenant and to process the input data set in the second distributed file system for a second tenant.

19. The computer system of claim 18, wherein the virtual disk of a first VM of the first plurality of VMs comprises a base virtual disk storing data blocks and a first delta disk, and wherein the virtual disk of a corresponding second VM of the second plurality of VMs comprises a second delta disk that references the base virtual disk of the first VM.

20. The computer system of claim 18, wherein the processor is further programmed to carry out the steps of:

instantiating a fourth plurality of VMs on the plurality of hosts, wherein each of the fourth plurality of VMs is configured as a data-only node of a third distributed file system storing the same input data set, and comprises a linked clone that references the linked clone of a corresponding VM of the second plurality of VMs.

\* \* \* \* \*